United States Patent [19]

Chujo et al.

[11] Patent Number: 5,618,609

[45] Date of Patent: Apr. 8, 1997

[54] BIAXIALLY ORIENTED FILM OF POLYETHYLENE-2,6-NA PHTHALENEDICARBOXYLATE

[75] Inventors: Takao Chujo; Masanori Nishiyama; Hisashi Hamano, all of Sagamihara, Japan

[73] Assignee: Teijin Limited, Osaka, Japan

[21] Appl. No.: 359,892

[22] Filed: Dec. 20, 1994

[30] Foreign Application Priority Data

Dec. 22, 1993 [JP] Japan ................................. 5-324050
Dec. 24, 1993 [JP] Japan ................................. 5-327276

[51] Int. Cl.$^6$ .......................... C08G 63/02; C08G 63/18
[52] U.S. Cl. .......................... 428/141; 428/143; 528/298
[58] Field of Search .......................... 428/141, 143; 528/298

[56] References Cited

U.S. PATENT DOCUMENTS

| | | | |
|---|---|---|---|
| 4,720,412 | 1/1988 | Katoh et al. | 428/480 |
| 5,312,893 | 5/1994 | Hamano et al. | 528/298 |
| 5,352,534 | 10/1994 | Hamano et al. | 528/298 |
| 5,380,577 | 1/1995 | Hamano et al. | 528/298 |

FOREIGN PATENT DOCUMENTS

| | | |
|---|---|---|
| 0609077 | 8/1994 | European Pat. Off. |
| 198328 | 7/1992 | Japan . |
| 5162196 | 2/1993 | Japan . |
| 117421 | 5/1993 | Japan . |
| 5192993 | 8/1993 | Japan . |
| 5261805 | 10/1993 | Japan . |

*Primary Examiner*—W. Robinson H. Clark
*Attorney, Agent, or Firm*—Sherman and Shalloway

[57] ABSTRACT

A biaxially oriented film of a polyethylene-2,6-naphthalene-dicarboxylate, which (1) has a Young's modulus of at least 600 kg/mm$^2$ in the transverse direction and a Young's modulus of at least 500 kg/mm$^2$ in the longitudinal direction, the Young's modulus in the transverse direction being greater than the Young's modulus in the longitudinal direction, (2) satisfies the following relationships between an elongation $S_T$ (%) in the transverse direction per kg/mm$^2$ of a load at 120° C. and the Young's modulus $Y_T$ (kg/mm$^2$) in the transverse direction, $$-0.001Y_T+0.89<S_T<-0.001Y_T+1.57$$

when $Y_T$ is at least 1,200 kg/mm$^2$, and $$-0.31<S_T<0.37$$

when $Y_T$ is greater than 1,200 kg/mm$^2$, and (3) has a heat shrinkage percentage of 0.1% or less in the longitudinal direction when heat-treated under no load at 70° C. for 1 hour. This film is almost free from a dimensional change in the transverse direction and is excellent in lubricity and durability and is useful as a base film for a magnetic recording medium capable of high-density recording for a long time.

18 Claims, No Drawings

BIAXIALLY ORIENTED FILM OF POLYETHYLENE-2,6-NAPHTHALENEDICARBOXYLATE

DETAILED DESCRIPTION OF THE INVENTION

The present invention relates to a biaxially oriented film of polyethylene-2,6-naphthalenedicarboxylate. More specifically, it relates to a biaxially oriented film of polyethylene-2,6-naphthalenedlcarboxylate useful as a base film for magnetic recording media, particularly a metal tape, which are capable of recording for a long time and high-density recording.

A polyethylene terephthalate film has been and is widely used as a base film for a magnetic tape in recent years, a magnetic tape is increasingly required to perform high-density recording for downsizing and high-quality display images, and it is also required to decrease the thickness and increase the recordable hours of the magnetic tape as a 8-mm video tape is typically required. Therefore, the magnetic tape is required to have a magnetic layer surface having higher flatness, and further, is required to have a smaller thickness. For complying with these requirements, the base film is also required to have a highly flat surface and a smaller thickness.

Conventional polyester films used for a magnetic tape for a home-use VTR have a rough surface, and no polyester films have satisfied the above requirements, or can be practically used. It is therefore required to greatly decrease the surface roughness for high-density recording. Generally, however, when the surface roughness of a film is decreased, the film surface/film surface lubricity decreases, and air present between the film/film interface is hardly released, so that it is very difficult to take up the film in the form of a roll. This difficulty in taking up the film greatly increases as the film thickness decreases.

For complying with the requirement of an increase in the recordable hours of a magnetic tape, it is necessary to decrease the thickness of the base film. The decrease in the thickness may sometimes cause a decrease in the stiffness of the tape, so that the tape edge is liable to be damaged when the tape is loaded or unloaded, or that a tape undergoes deformation and recorded data is liable to have a strain when high tensile force is instantaneously exerted on the tape. For these reasons, the base film for a magnetic tape having long recordable hours is required to have a high Young's modulus.

A biaxially oriented polyethylene terephthalate film has been conventionally used as a base film for the above magnetic recording tape, and in particular, there is known a so-called supertensilized film of which the Young's modulus in the longitudinal direction is increased for long recordable hours. In this film, however, the maximum Young's modulus in the longitudinal direction is 850 kg/mm$^2$ at most, and the maximum Young's modulus in the transverse direction is 450 kg/mm$^2$ at most. Further, an attempt to increase the Young's modulus in the longitudinal direction inevitably decreases the Young's modulus in the transverse direction, and the tape is liable to suffer damage on its edge portion when it is running repeatedly. As a result, the tape undergoes crinkly deformation to impair the properties of the magnetic tape. When an attempt is made to increase the Young's modulus in width direction (also referred to as "transverse direction" hereinafter) for coping with the above problem, it unavoidably results in a failure in obtaining a sufficient Young's modulus in the longitudinal direction, and the touch (contact) of the magnetic tape to a magnetic head is poor to cause fluctuation in output.

Further, VTRs equipped with cameras are recently widely used, and these machines are more frequently used outdoors or in automobiles. As a result, the magnetic tape is often exposed to severe more temperature conditions than it was heretofore used. When a magnetic tape is used for recording or reproducing in such a high-temperature atmosphere, the base film or the magnetic tape suffers a decrease in its Young's modulus, and the magnetic tape elongates or undergoes crinkly deformation to impair the magnetic tape properties. The tape is increasingly required to have dimensional stability with which it is free from a skew strain even when used in such a high-temperature atmosphere, and there is hence a strong demand for the dimensional stability for its base film. However, in a conventional base film of which the thickness is decreased to achieve a high Young's modulus by stretching at a high stretch ratio, the strain which has occurred in molding remains to make the dimensional stability poor. The stretching at a high stretch ratio has another problem in that the yield is low.

Meanwhile, there are various proposals for magnetic tapes having, as a base film, a film of polyethylene-2,6-naphthalate (to be sometimes referred to as "PEN" hereinafter) which is a polyester having excellent dimensional stability against heat over polyethylene terephthalate (to be sometimes referred to as "PET" hereinafter).

Japanese Laid-open Patent Publication No. 198328/1992 discloses a polyethylene-2,6-naphthalate film containing (i) 0.02 to 1.0% by weight of particles of at least one member selected from silicon oxide and aluminum oxide each of which is an aggregate of primary particles having an average particle diameter of 0.005 to 0.08 μm and has an average particle diameter of 0.03 to 0.2 μm and (ii) 0.005 to 0.3% by weight of particles of at least one member selected from a crosslinked polymer and calcium carbonate each of which has an average particle diameter of 0.2 to 0.8 μm, and having a plane orientation degree of 0.255 to 0.280.

The invention of the above Japanese laid-open Patent Publication seeks to improve the film in abrasion resistance and lubricity by allowing a PEN film to contain specific proportions of aggregate particles having a specific average particle diameter (particles selected from silicon oxide and aluminum oxide) and particles selected from a crosslinked polymer and calcium carbonate. However, it is difficult to obtain a magnetic tape having high surface properties for high-density recording, only by incorporating the above particles. For example, since aggregate particles of silicon oxide or aluminum oxide are contained, it is assumed that voids occur in the film, and it is also assumed that these particles cause the formation of coarse projections on the film surface or the deterioration of the film in abrasion resistance. The above Japanese Laid-open Patent Publication does not describe any particle size distribution of the particles contained in the film. However, even when the average particle diameter is the same, if the particle size distribution is not sharp, the distribution of projections formed on the film surface is not uniform, and no uniform surface projections having a uniform height are obtained. As a result, the lubricity deteriorates.

Further. Japanese Laid-open Patent Publication No. 117421/1993 discloses a technique which specifies the surface roughness of a PEN film. In this technique, however, the base film suffers a load of high tension at a high temperature when a magnetic layer is coated and dried for producing a magnetic tape. In this case, the base film may be elongated to undergo undulation, so that the applied magnetic layer may become nonuniform.

Co-pending U.S. patent application Ser. No. 07/949,854 discloses a biaxially oriented, unidirectionally long polyethylene-2,6-naphthalate film,
(A) having a Young's modulus of at least 550 kg/mm² in the longitudinal direction and a Young's modulus of at least 600 k/mm² in the transverse direction, the Young's modulus in the longitudinal direction being greater than the Young's modulus in the transverse direction,
(B) having a heat shrinkage, after heat treatment at 70° C. for 1 hour under no load, of 0.1% or less, and
(C) having a surface roughness, Ra, of 12 nm or less.

However, the above Application discloses nothing concerning the elongation of the film in the transverse direction at a relatively high temperature under a high load.

Co-pending U.S. patent application Ser. No. 08/275,736 discloses a unidirectionally long, biaxially oriented film of polyethylene-2,6-naphthalendicarboxylate:
(A) which has a Young's modulus of 400 to 600 kg/mm² in the machine direction and a Young's modulus of at least 1,200 kg/mm² in the transverse direction, the ratio of the Young's modulus in the transverse direction to the Young's modulus in the machine direction being at least 2.5,
(B) which has a heat shrinkage of 1% or less after heat-treated under no load at 105° C. for 30 minutes, and
(C) which has a surface roughness (Ra) of 0.005 to 0.010 μm.

However, the above Application discloses nothing concerning the elongation of the film in the transverse direction at a relatively high temperature under a high load.

As described above, there has been known no polyester film which is almost free from a dimensional change in the transverse direction and has high strength and which is excellent in flatness and fully satisfies the requirements of a base film for a magnetic recording medium capable of recording for a long time and of high density recording.

It is therefore an object of the present invention to provide a biaxially oriented film of polyethylene-2,6-naphthalenedicarboxylate, which is almost free from a dimensional change in the transverse direction and which is excellent in lubricity and durability and useful as a base film for a magnetic recording medium capable of high-density recording for a long time.

It is another object of the present invention to provide a biaxially oriented PEN film as a base film for a magnetic recording medium, which overcomes the above-described defects, which has high strength and is excellent in electromagnetic conversion characteristics and durability when formed into a high-density magnetic recording tape, and which is also excellent in dimensional stability against heat, lubricity and flatness.

Other objects and advantages of the present invention will be apparent from the following description.

According to the present invention, the above objects and advantages of the present invention are achieved by a biaxially oriented film of a polyethylene-2,6-naphthalenedlcarboxylate, which
(1) has a Young's modulus of at least 600 kg/mm² in the transverse direction and a Young's modulus of at least 500 kg/mm² in the longitudinal direction, the Young's modulus in the transverse direction is greater than the Young's modulus in the longitudinal direction,
(2) satisfies the following relationships between an elongation $S_T$ (%) in the transverse direction per a load of 1 kg/mm² at 120° C. and the Young's modulus $Y_T$ (kg/mm²) in the transverse direction, $$-0.001Y_T + 0.89 < S_T < -0.001Y_T + 1.57$$

when $Y_T$ is 1.200 kg/mm² or less, and $$-0.31 < S_T < 0.37$$

when $Y_T$ is greater than 1.200 kg/mm², and
(3) has a heat shrinkage percentage of 0.1% or less in the longitudinal direction when heat-treated under no load at 70° C. for 1 hour.

For the polyethylene-2,6-naphthalenedicarboxylate for forming the film of the present invention, 2,6-naphthalenedicarboxylic acid is a main acid component, while a small amount of other dicarboxylic acid may be used as a comonomer. Further, ethylene glycol is a main glycol component, while a small amount of other glycol component may be used as a comonomer. The dicarboxylic acid component other than 2,6-naphthalenedicarboxylic acid includes aromatic dicarboxylic acids such as terephthalic acid, isophthalic acid, diphenylsulfonedicarboxylic acid, benzophenonedicarboxylic acid and isomers of 2,6-naphthalenedicarboxylic acid. e.g., 2,7-naphthalenedicarboxylic acid; aliphatic dicarboxylic acids such as succinic acid, adipic acid, sebacic acid and dodecanedicarboxylic acid; and alicyclic dicarboxylic acids such as hexahydroterephthalic acid and 1,3-adamantanedicarboxylic acid. The glycol component other than ethylene glycol includes 1,3-propanediol, 1,4-butanediol, 1,6-hexanediol, neopentyl glycol, 1,4-cyclohexanedimethanol, p-xylylene glycol and diethylene glycol. Further, the polymer (polyethylene-2,6-naphthalenedicarboxylate) may contain additives such as a stabilizer and a colorant.

The above PEN polymer is generally produced by a known method according to a melt polymerization method. Additives such as a catalyst may be used as required. The intrinsic viscosity of PEN is preferably in the range of from 0.45 to 0.90.

The biaxially oriented film of the present invention has a Young's modulus in the transverse direction, of at least 600 kg/mm², which is a factor that prevents the damage of a side edge of the tape while it is running. When the Young's modulus in the transverse direction is less than 600 kg/mm², even if a high-strength magnetic binder is used, it is difficult to prevent the damage of a side edge of the tape.

The Young's modulus in the transverse direction is preferably at least 700 kg/mm², more preferably at least 800 kg/mm², especially preferably at least 1,000 kg/mm².

The biaxially oriented film of the present invention has a Young's modulus in the longitudinal direction, of at least 500 kg/mm². When the Young's modulus of the biaxially oriented film in the longitudinal direction is less than 500 kg/mm², even if a high-strength magnetic binder is used, a magnetic tape having a base film thickness of 12 μm or less and a tape thickness of 16 μm and having the capacity of recording and reproducing for a long time can have no sufficient Young's modulus as a tape, and sometimes undergoes edge bending and elongation while it is running.

The Young's modulus in the longitudinal direction is preferably more than 600 kg/mm², more preferably more than 700 kg/mm².

In the biaxially oriented film of the present invention, the Young's modulus in the transverse direction is required to be greater than the Young's modulus in the longitudinal direction. Preferably, the Young's modulus in the transverse direction is greater than the Young's modulus in the longitudinal direction by at least 230 kg/mm². When the Young's modulus in the transverse direction is smaller than the Young's modulus in the longitudinal direction, there is a problem in that the contact of the tape to a rotary head of a video tape recorder (head touch) is poor, and that the output in producing recorded signals is insufficient.

The biaxially oriented film of the present invention can be imparted with the above Young's moduli by a method in which an unstretched film is simultaneously stretched, or consecutively stretched, in the transverse and longitudinal directions with a general roll or stenter. Further, the unstretched film may be stretched in the longitudinal and transverse directions once in each direction, or may be stretched at least twice in the longitudinal and/or transverse direction directions, although the number of stretching in each direction is not specially limited.

For example, when the stretching is carried out in a two-stage stretching manner, PEN is melt-extruded at a temperature of between Tm and (Tm+70)° C. (in which Tm refers to the melting point of PEN) to prepare an unstretched film having an intrinsic viscosity of 0.45 to 0.9 dl/g, the unstretched film is monoaxially stretched (i.e., in the transverse or longitudinal direction) at a temperature between (Tg−10) and (Tg+70)° C. (in which Tg refers to the glass transition temperature of PEN) at a stretch ratio of 2.5 to 7.0, and then the monoaxially stretched film is stretched at right angles with the above stretching direction (e.g., in the transverse direction in the second stage when the stretching in the first stage is carried out in the longitudinal direction) at a temperature between Tg (° C.) and (Tg+70)° C. at a stretch ratio of 2.5 to 7.0. In this case, the area stretch ratio is so that the area of the biaxially oriented film is preferably 15 to 35 times, more preferably 20 to 35 times, as large as the area of the unstretched film.

When the stretching is carried out in a three or more-stage stretching manner, preferably, the above biaxially oriented film is heat-set at a heat-set temperature between (Tg+20) and (Tg+70)° C., and then, the film is stretched in the longitudinal or transverse direction at a temperature higher than the heat-set temperature by 10° to 40° C. and then stretched in the transverse or longitudinal direction at a temperature higher than the above stretching temperature by 20° to 50° C., so that the total stretch ratio in the longitudinal direction is 4.0 to 8.0 and that the total stretch ratio in the transverse direction is 5.0 to 12.0. In this case, the area stretch ratio is preferably 20 to 50, more preferably 25 to 45.

The characteristic performance of the biaxially oriented film of the present invention is that the biaxially oriented film satisfies the following relationships (A) and (B) between an elongation $S_T$ (%) in the transverse direction per a load of 1 kg/mm$^2$ at 120° C. and the Young's modulus $Y_T$ (kg/mm$^2$) in the transverse direction, $$-0.001Y_T+0.89<S_T<-0.001Y_T+1.57 \qquad (A)$$

when $Y_T$ is 1,200 kg/mm$^2$ or less, and $$-0.31<S_T<0.37 \qquad (B)$$

when $Y_T$ is greater than 1,200 kg/mm$^2$.

As defined by the above relationship (A), the elongation $S_T$ (%) decreases with an increase in the Young's modulus $Y_T$ (kg/mm$^2$) in the transverse direction when the $Y_T$ is in the range of from 600 to 1,200 kg/mm$^2$. When $Y_T$ exceeds 1,200 kg/mm$^2$, $S_T$ is a constant value regardless of $Y_T$. A negative value of $S_T$ (%) represents a shrinkage percentage (%).

A biaxially oriented film failing to satisfy the above relationships (A) and (B) is elongated in the transverse direction to degrade the film flatness, make it difficult form a precise and uniform coating and cause a nonuniform magnetic coating when a magnetic coating composition is applied and dried in a tape production step.

Between $S_T$ and $Y_T$, preferably, the following relationship (A)-1 is satisfied when $Y_T$ is 1,200 kg/mm$^2$ or less, $$-0.001Y_T+1.05<S_T<-0.001Y_T+1.48 \qquad (A)\text{-}1$$

and the following relationship (B)-1 is satisfied when $Y_T$ is greater than 1,200 kg/mm$^2$.

$$-0.15<S_T<0.28 \qquad (B)\text{-}1$$

Further, between $S_T$ and $Y_T$, more preferably, the following relationship (A)-2 is satisfied when $Y_T$ is 1,200 kg/mm$^2$ or less, $$-0.001Y_T+1.14<S_T<-0.001Y_T+1.40 \qquad (A)\text{-}2$$

and the following relationship (B)-2 is satisfied when $Y_T$ is greater than 1,200 kg/mm$^2$.

$$-0.06<S_T<0.20 \qquad (B)\text{-}2$$

For producing the biaxially oriented film of the present invention which satisfies the above relationships between $S_T$ and $Y_T$, it is necessary take into consideration means of decreasing $S_T$ when the above means of increasing the Young's modulus $Y_T$ is carried out. For this purpose, for example, it is preferred to make the stretch ratio in the longitudinal direction the same as, or greater than, the stretch ratio in the longitudinal direction, to select heat-setting conditions suitable for keeping the elongation in the transverse direction at a low level, and optionally to adjust the heat-relaxation conditions for decreasing the heat shrinkage percentage. That is, $S_T$ greatly differs depending upon the stretch ratio and heat-set temperature, and it is therefore advantageous to carry out the following procedures. Films are preliminary prepared at various stretch ratios and at various heat-set temperatures under a range of conditions proper to obtain Young's moduli of a biaxially oriented film of the present invention in the longitudinal and transverse directions, and the films are measured for elongations in the transverse direction and for Young's moduli in the longitudinal and transverse directions at the same time. While the found measurement values are compared, an optimum stretch ratio and an optimum heat-set temperature are selected. Further, the shrinkage percentage is brought into a preferred range by heat relaxation, and conditions for the heat relaxation are selected such that the Young's modulus decreased by the heat relaxation is still within the range of the Young's modulus in the longitudinal direction, specified in the present invention, whereby the biaxially oriented film of the present invention is obtained.

Further, after the biaxially oriented film of the present invention is heat-treated under no load at 70° C. for 1 hour, the heat shrinkage percentage thereof in the longitudinal direction is 0.1% or less. When the heat shrinkage percentage is greater than 0.14%, undesirably, the film undergoes a thermal irreversible change even after it is formed into a magnetic tape, and the tape sometimes causes a skew on a screen when the temperatures for recording and reproducing with a VTR are different. Further, when the heat; shrinkage percentage is large, the base film may be imprinted on a magnetic surface, and the surface roughness of the magnetic surface is liable to increase. The heat shrinkage percentage is preferably 0.08% or less, more preferably 0.05% or less.

For decreasing the heat shrinkage percentage, it is general practice to increase the temperature for heat-treating the stretched film. However, when the heat treatment temperature is increased to excess, the mechanical properties of the film consequently deteriorate, and scratches often occur when the film is processed into a magnetic tape. And, scratch dust adheres to the magnetic surface of the magnetic tape to cause drop-out. The heat shrinkage percentage is therefore decreased by heating the heat-treated film under low tension and relaxing the film in the longitudinal direction. The film is relaxed in the longitudinal direction according to an air-floating treatment method in which the film is relaxed in a non-contact state while heated under low tension, a method in which the film is relaxed by passing the film through nips of heating rolls and cooling rolls which are rotated at different rates, or a method in which the proceeding rates of clips holding the film in a tenter are consecutively moderated. Any one method may be used if the film can be relaxed in the longitudinal direction.

In any one of the above methods, the biaxially oriented film may be heat-set at a temperature between $(Tg+70)°$ C. and Tm (° C.). For example, the heat-setting is preferably carried out at a temperature between 190° and 240° C. for 1 to 60 seconds. Further, the heat relaxation is carried out, whereby the film of the present invention having a desirable heat shrinkage percentage can be obtained.

The plane orientation coefficient NS of the biaxially oriented film of the present invention preferably has the following relationships with an average refractive index nA, represented by the formulae (C) and (D).

$$NS \geq 1.607nA - 2.434 \quad (C)$$

$$1.665 \leq nA \leq 1.675 \quad (D)$$

in which nA is determined by the following equation, $$nA = \frac{nx + ny + nz}{3}$$

in which nx is the refractive index of a biaxially oriented film in the machine direction, ny is the refractive index at right angles with the machine direction, and nz is the refractive index in the film thickness direction.

More preferably, the biaxially oriented film of the present invention has the plane orientation coefficient NS of at least 0.281 and the average refractive index satisfies the above relationship (D). The plane orientation coefficient NS is determined by the following equation.

$$NS = \frac{nx + ny}{2} - nz$$

wherein nx is the refractive index of a biaxially oriented film in the machine axis direction, ny is the refractive index at right angles with the machine direction, and nz is the refractive index in the film thickness direction.

A base film having the above plane orientation coefficient of at least 0.281 has sufficient nerve, has excellent thickness uniformity and serves to form a uniform magnetic layer capable of high-density recording in the production of a magnetic tape. Preferably, therefore, the so-obtained magnetic layer is excellent in tracing contact to a magnetic head, and gives a magnetic recording medium stable in output.

The above formula (C) is preferably represented by the following formula (C)-1, $$NS \geq 1.607nA - 2.430,$$

more preferably by the following formula (C)-2.

$$NS \geq 1.607nA - 2.427$$

The base film which satisfies both the relationships represented by the above formulae (C) and (D) has sufficient nerve, has a higher orientation degree in the transverse direction than that in the longitudinal direction, has excellent thickness uniformity and serves to give a uniform magnetic layer capable of high-density recording in the production of a magnetic tape. Therefore, the so-formed magnetic layer is excellent in tracing contact to a magnetic head, and gives a magnetic recording medium stable in output. Further, it has a low heat shrinkage percentage and is free from a skew strain caused by a temperature change on the magnetic tape and imprinting of the magnetic layer on the reverse surface.

When the above formula (C) is not satisfied, both the orientation degree in the longitudinal direction and the orientation degree in the transverse direction are low, the magnetic tape is liable to undergo elongation and damage to its edge, and the contact to a magnetic head under predetermined conditions is not stably kept, so that errors are liable to occur in recording and reproducing. Further, the thickness uniformity is poor and slacking occurs, so that nonuniformity of a magnetic layer and magnetic omission are liable to occur, and the output is liable to fluctuate in reproducing.

When the above formula (D) is not satisfied and when the average refractive index nA>1.675, the Young's modulus is low and the nerve is insufficient, so that the tape is liable to cause errors in recording and reproducing. Further, the thickness uniformity is poor and slacking occurs to cause poor flatness, so that nonuniformity of a magnetic layer and magnetic omission are liable to occur. Moreover, the tape is liable to be poor in mechanical properties and resistance to deterioration against heat. When the average refractive index nA<1.665, the Young's modulus in the transverse direction is lower than the Young's modulus in the longitudinal direction, and the magnetic tape causes edge damage and errors in recording and reproducing.

Studies by the present inventors have revealed that the biaxially oriented film of the present invention is excellent in take-up properties as a base film and running properties and electromagnetic conversion characteristics as a magnetic tape when the height of projections formed on the film surface and the number of the projections are in specific ranges. In the biaxially oriented film of the present invention, the height [h (unit: nm)] and the number of projections formed on the film surface are preferably in the following range,

| $1 \leq h < 50$ | 1,000–10,000 pieces/mm$^2$ |
| $50 \leq h < 100$ | 10–200 pieces/mm$^2$ |
| $100 \leq h < 150$ | 10–100 pieces/mm$^2$ |
| $150 \leq h$ | 0 piece/mm$^2$ | more preferably in the following range,

| $1 \leq h < 50$ | 1,500–8,000 pieces/mm$^2$ |
| $50 \leq h < 100$ | 10–100 pieces/mm$^2$ |
| $100 \leq h < 150$ | 10–70 pieces/mm$^2$ |
| $150 \leq h$ | 0 piece/mm$^2$ | particularly preferably in the following range.

| $1 \leq h < 50$ | 2,000–5,000 pieces/mm$^2$ |
| $50 \leq h < 100$ | 10–80 pieces/mm$^2$ |
| $100 \leq h < 150$ | 10–50 pieces/mm$^2$ |
| $150 \leq h$ | 0 piece/mm$^2$ |

A base film which satisfies the above range is excellent in handling property, and is excellent in running properties and electromagnetic conversion characteristics as a magnetic tape. A film having more than 10,000 pieces/mm² of projections having a height h (unit: nm) of 1≤h<50 is liable to cause film abrasion with a roll when calendar-treated. A film having more than 200 pieces/mm² of projections having a height of 50≤h<100 is liable to show a decrease in electromagnetic conversion characteristics as a magnetic tape. A film having more than 100 pieces/mm² of projections having a height h of 100≤h<150 is excellent in running properties as a magnetic tape, while it is liable to show a decrease in electromagnetic conversion characteristics and to cause drop-out as a magnetic tape. Further, when a film has projections having a height of 150≤h, the electromagnetic conversion characteristics is liable to decrease and the drop-out is liable to occur frequently, since the frequency of the presence of coarse particles is large. Further, course projections having a height of 150≤h are abraded when the tape is running, and consequently promotes the occurrence of drop-out. When a film has less than 1,000 pieces/mm² of projections having a height of 1≤h<50, less than 10 pieces/mm² of projections having a height of 50≤h<100 and less than 10 pieces/mm² of projections having a height of 100≤h<150, the coefficient of friction increases, and it is very difficult to handle the film and take up the film in the form of a roll. Further, it shows poor running properties as a tape. The number of projections having a height of h<1 is not specially limited.

A film having the above-described surface properties can be obtained, for example, by incorporating into PEN several kinds of inert solid fine particles having different particle size distributions. Examples of the inert solid fine particles preferably include (1) silicon dioxide (including hydrate, diatomaceous earth, silica sand and quartz); (2) alumina; (3) silicates containing at least 30% by weight of an $SiO_2$ component (e.g., amorphous or crystalline clay mineral and alumlnosilicate (including calcined materials and hydrates), chrysotile, zircon and fly ash)); (4) oxides of Mg, Zn, Zr and Ti; (5) sulfides of Ca and Ba; (6) phosphates of Li, Na and Ca (including monohydrates and dihydrates); (7) benzoates of Li, Na and K; (8) terephthalates of Ca, Ba, Zn and Mn; (9) titanares of Mg, Ca, Ba, Zn, Cd, Pb, Sr, Mn, Fe, Co and Ni; (10) chromates of Ba and Pb; (11) carbon (e.g., carbon black and graphite); (12) glass (e.g., glass powder and glass beads); (13) carbonates of Ca and Mg; (14) fluorite; (15) ZnS and (16) fine particles of polymers having high heat resistance such as a silicone resin and crosslinked polystyrene. More preferred are fine particles of any one of silicon dioxide, silicic acid anhydride, hydrous silicic acid, aluminum oxide, aluminum silicate (including calcined material and hydrates), monolithium phosphate, trilithium phosphate, sodium phosphate, calcium phosphate, barium sulfate, titanium oxide, lithium benzoate, double salts of these compounds (including hydrates), glass powder, clay (including kaolin, bentonite and china clay), talc, diatomaceous earth, calcium carbonate, a silicone resin and crosslinked polystyrene. Particularly preferred are silicon dioxide, titanium oxide, calcium carbonate, fine particles of a silicone resin and fine particles of crosslinked polystyrene. The film is allowed to contain at least one kind of the above inert solid fine particles.

The above inert solid fine particles may be added to PEN before the polymerization of PEN or during the polymerization. Further, the inert solid fine particles may be mixed with PEN in an extruder when the polymerized PEN is pelletized, or may be dispersed in PEN in an extruder before PEN is extruded in the form of a sheet. In view of dispersibility, it is preferred to add them before the polymerization.

However, the method of obtaining a biaxially oriented film having the surface properties according to the present invention is not limited to the method of adding inert solid fine particles to PEN. There may be preferably employed a method in which a phosphorus component or other necessary additive is added during the polymerization to generate a particle source to form particles to be contained in the film, or a method in which PEN polymerized in the presence of a phosphorus component and PEN polymerized in the presence of inert solid fine particles are blended.

The film surface properties according to the present invention can be adjusted by effecting other surface treatment, e.g., coating treatment, on the surface of a film containing no inert solid fine particles or a film containing the inert solid fine particles.

The thickness of the biaxially oriented film of PEN of the present invention is not specially limited, while it is preferably 12 μm or less, particularly preferably 6 μm or less for using the biaxially oriented film for a video tape used for long-hour recording and reproducing as long as 180 minutes or longer or a DCC tape. The lower limit of the film thickness is preferably 3 μm in view of film stiffness.

The present invention will be further explained hereinafter with reference to Examples. Various physical property values and characteristics in the present invention are measured and defined as follows.

(1) Number of surface projections

Measured with a non-contact, three-dimensional roughness tester (TOPO-3D) supplied by WYKO at a measurement magnification of 40 times at a measurement area of 242 μm×239 μm (0.058 mm²). A histogram of the heights of surface projections and the number of the projections was obtained on the basis of an average roughness of the film surface by projection analysis, and the numbers of projections in the specific ranges were determined on the basis of the histogram. The same film was measured in five places, and the numbers of projections were added up and converted to the number of projections per a unit area (1 mm²).

(2) Young's modulus

A film was cut to prepare a sample having a width of 10 mm and a length of 150 mm, and the sample was tensioned with an Instron type universal tensile tester at an interchuck distance of 100 mm, at a tension rate of 10 mm/minute and at a charting rate of 500 mm/minute. The Young's modulus was calculated on the basis of a tangent in a rising portion of the resultant load-elongation curve.

(3) Refractive index

A film was measured for a refractive index with an Abbe refractometer using sodium D ray (589 nm) as a light source. At the same time, the film was measured for an orientation degree with a molecular orientation meter (MOA-2001A) supplied by Kanzaki Paper Mfg. Co., Ltd. A refractive index of a large value unmeasurable with the Abbe refractometer was determined on the basis of a graph for a correlation between the orientation degree and the refractive index.

(4) Elongation of film

Film samples having a width of 5 mm and a length of 15 mm were set in TMA (TM-3000L) supplied by Shinkuriko K. K., and temperature-increased from 20° C. to 150° C. at a temperature elevation rate of 5° C./minute under loading conditions: 0 g (no load), 25 g, 50 g, 75 g and 100 g. An elongation percentage of each film sample at 120° C. was determined, a graph for a correlation between the elongation percentage and a load per the cross section of the film (kg/mm²) was prepared. The elongation (%) per a load of 1 kg/mm² was determined on the basis of the graph.

(5) Electromagnetic conversion characteristics

A magnetic tape for VTR was measured for an S/N ratio with a noise meter supplied by Shibasoku Co., Ltd. Further, a difference between the so-obtained S/N ratio and the S/N ratio of a tape of Comparative Example 3 in Table 1 was determined. A VTR, EV-S700, supplied by Sony Co., Ltd., was used.

(6) Durability of magnetic tape

While a magnetic tape was allowed to run and stop repeatedly with EV-S700 supplied by Sony Co., Ltd., for 100 hours, the tape was examined on its running state and measured for an output. The running durability of the tape was determined as follows.

<Evaluation based on 3 ratings>

0: Tape edge neither elongates nor causes any crinkly form. The output does not fluctuate.

Δ: Tape edge elongates and becomes crinkly to some extent. The output fluctuates to some extent.

X: Tape edge extraordinarily elongates and becomes crinkly. The tape unstably runs, and the output greatly fluctuates.

(7) Heat shrinkage percentage

A film having a length of about 30 cm and a width of 1 cm, which had been accurately measured for its length in advance, was placed in an oven at 70° C. under no load, and heat-treated for 1 hour. Then, the film was taken out of the oven, and allowed to stand until it had a room temperature. Then, the film was measured for a length to determine a change in the length. The heat shrinkage percentage was determined by the following equation, $$\text{Heat shrinkage percentage } (\%) = \frac{\Delta L}{L_0} \times 100$$

in which $L_0$ is the length before the heat treatment and $\Delta L$ is a dimensional change amount due to heat treatment.

(8) Skew

A video tape used for recording at an ordinary temperature (20° C.) at an ordinary humidity was heat-treated at 70° C. for 1 hour, and the tape was played back at an ordinary temperature at an ordinary humidity. And, a skew deviation at a VTR head switching point was measured.

(9) Average particle diameter of inert fine particles

Measured with a CP-50 centrifugal particle size analyzer supplied by Shimadzu Corporation. An accumulative curve of particles having predetermined sizes and amounts thereof was prepared on the basis of a centrifugal sedimentation curve obtained, and a particle diameter corresponding to 50 mass percent was determined. This value was taken as the above average particle diameter.

(10) Defect-free product ratio of rolled tapes

A film was take up in the form of a roll having a film width of 500 mm and a film length of 4,000 m to prepare 100 rolls, and the number of defect-free products was expressed in percentage. The defect-free products refer to film rolls which are cylindrically taken-up and have neither square deformations nor sagging portions and have no wrinkles.

EXAMPLE 1

Pellets of a PEN containing 0.15% by weight of spherical silica particles having an average particle diameter of 0.15 μm and 0.03% by weight of calcium carbonate particles having an average particle diameter of 0.4 μm, and having an intrinsic viscosity of 0.62 dl/g (measured in o-chlorophenol at 25° C.) were dried at 170° C. and then melt-extruded at 300° C. and the extrudate was rapidly cooled on a casting drum kept at 60° C. to give an unstretched film having a thickness of about 230 μm.

The above unstretched film was consecutively biaxially stretched 5.0 times in the longitudinal direction at 130° C. and 5.0 times in the transverse direction at 135° C., and while the biaxially oriented film was heat-set at 215° C. it was stretched 1.3 times in the transverse direction. Then, this heat-set biaxially oriented PEN film was heated to 110° C. with a hot roll, and adjusted to a heat shrinkage percentage of 0.03% in the longitudinal direction by adjusting the tension of the film with a cooling roll. The so-obtained film had a thickness of 7 μm.

Separately, a composition of the following components was placed in a ball mill, and kneaded and dispersed for 16 hours, and 5 parts by weight of an isocyanate compound (Desmodur L, supplied by Bayer AG). The mixture was shear-dispersed at a high speed for 1 hour to give a magnetic coating composition.

Components for magnetic coating composition

|  | Part by weight |
| --- | --- |
| Acicular Fe particles | 100 |
| Vinyl chloride-vinyl acetate copolymer (S-LEC 7A, supplied by Sekisui Chemical Co., Ltd.) | 15 |
| Thermoplastic polyurethane resin | 5 |
| Chromium oxide | 5 |
| Carbon black | 5 |
| Lecithin | 2 |
| Fatty acid ester | 1 |
| Toluene | 50 |
| Methyl ethyl ketone | 50 |
| Cyclohexanone | 50 |

The above-prepared magnetic coating composition was applied to one surface of the above biaxially oriented PEN film to form a coating having a thickness of 3 μm, and the coating was subjected to orientation treatment in a direct current magnetic field at 2,500 Gausses, dried under heat at 100° C., and treated with a super calendar (linear pressure 200 kg/cm, temperature 80° C. Then, the film was taken up. The so-obtained roll of the film was allowed to stand in an oven at 55° C. for 3 days.

Further, a back coating composition of the following components was applied to form a back coating having a thickness of 1 μm and dried, and the back-coated film was cut to a width of 8 mm to give a magnetic tape.

Components for back coating composition

|  | Part by weight |
| --- | --- |
| Carbon black | 100 |
| Thermoplastic polyurethane resin | 60 |
| Isocyanate compound ("Coronate L, supplied by Nippon Polyurethane Industry Co., Ltd.) | 18 |
| Silicone oil | 0.5 |
| Methyl ethyl ketone | 250 |
| Toluene | 50 |

Table 1 shows the physical properties of the above-obtained film and magnetic tape. As is clearly shown in Table 1, the film was excellent in defect-free product ratio and free of any processability problem, and the tape was excellent in running properties, electromagnetic conversion characteristics and skew. Further, the tape was also excellent in use in a high-temperature atmosphere.

EXAMPLE 2

An unstretched film was obtained in the same manner as in Example 1. The unstretched film was stretched 2.0 times in the longitudinal direction at 130° C., then stretched 3.8 times in the transverse direction at 130° C, and subjected to intermediate heat treatment at 160° C. Further, this biaxially oriented film was stretched 2.1 times in the longitudinal direction at 170° C., stretched 1.7 times in the transverse direction under the heat-setting at 215° C. Then, the so-obtained film was treated in the same manner as in Example 1 to obtain a film having a heat shrinkage percentage of 0.03% in the longitudinal direction. As a result, a biaxially oriented film having a thickness of 7 μm was obtained.

Then, a tape was obtained in the same manner as in Example 1. Table 1 shows the results. The film and tape showed results as excellent as those in Example 1.

EXAMPLE 3

An unstretched film was obtained in the same manner as in Example 1 except that the inert solid fine particles were replaced with 0.035% by weight of spherical silica particles having an average particle diameter of 0.1 μm as small-diameter particles and 0.015% by weight of calcium carbonate particles having an average particle diameter of 0.8 μm as large-diameter particles. The unstretched film was stretched 2.3 times in the longitudinal direction at 130° C., then stretched 3.9 times in the transverse direction at 130° C., and subjected to intermediate heat treatment at 160° C. Further, this biaxially oriented film was stretched 2.2 times in the longitudinal direction at 170° C., stretched 1.9 times in the transverse direction under the heat-setting at 215° C. Then, the so-obtained film was treated in the same manner as in Example 1 to obtain a film having a heat shrinkage percentage of 0.03% in the longitudinal direction. As a result, a biaxially oriented film having a thickness of 7 μm was obtained.

Then, a tape was obtained in the same manner as in Example 1. Table 1 shows the results. The film and tape showed results as excellent as those in Example 1.

EXAMPLE 4

An unstretched film having a thickness of about 220 μm was obtained in the same manner as in Example 1. The unstretched film was stretched 2.2 times in the longitudinal direction at 130° C., then stretched 4.2 times in the transverse direction at 130° C., and subjected to intermediate heat treatment at 160° C. Further, this biaxially oriented film was stretched 2.0 times in the longitudinal direction at 170° C., stretched 2.0 times in the transverse direction under the heat-setting at 215° C. Then, this heat-set biaxially oriented PEN film was heated to 110° C. with a hot roll, and then adjusted to a heat shrinkage percentage of 0.03% in the longitudinal direction by adjusting the tension of the film with a cooling roll. The so-obtained film had a thickness of 6 μm.

Then, a tape was obtained in the same manner as in Example 1. Table 1 shows the results. The film and tape showed results as excellent as those in Example 1.

EXAMPLE 5

An unstretched film was obtained in the same manner as in Example 1. The unstretched film was stretched 2.2 times in the longitudinal direction at 130° C., then stretched 4.2 times in the transverse direction at 130° C., and subjected to intermediate heat treatment at 160° C. Further, this biaxially oriented film was stretched 2.0 times in the longitudinal direction at 170° C., stretched 2.2 times in the transverse direction under the heat-setting at 215° C. Then, the so-obtained film was treated in the same manner as in Example 1 to obtain a film having a heat shrinkage percentage of 0.03% in the longitudinal direction. As a result, a biaxially oriented film having a thickness of 6 μm was obtained.

Then, a tape was obtained in the same manner as in Example 1. Table 1 shows the results. The film and tape showed results as excellent as those in Example 1.

Comparative Example 1

Pellets of a PET containing 0.2% by weight of spherical silica particles having an average diameter of 0.1 μm as small-diameter particles and 0.05% by weight of calcium carbonate particles having an average particle diameter of 0.45 μm as large-diameter particles, and having an intrinsic viscosity of 0.65 dl/g (measured In o-chlorophenol at 25° C.) were dried at 160° C. and then melt-extruded at 280° C., and the extrudate was rapidly cooled on a casting drum kept at 40° C. to give an unstretched film having a thickness of about 110 μm. The so-obtained unstretehed film was stretched 3.2 times in the longitudinal direction between two rolls having different rotation rates, and stretched 4.5 times in the transverse direction with a tenter, and while the biaxially oriented film was heat-set at 215° C., it was stretched 1.1 times in the transverse direction. This heat-set, biaxially oriented PET film was heated to 90° C. with a hot roll, and then subjected to a treatment for decreasing the heat shrinkage percentage in the longitudinal direction by adjusting the tension of the film with a cooling roll, so that a biaxially oriented PET film having a thickness of 7 μm was obtained. Thereafter, a tape was obtained therefrom in the same manner as in Example 1. Table 1 shows the results. Although the heat shrinkage percentage was decreased by the relaxation heat treatment, the film had a high heat shrinkage percentage and was very poor with regard to the skew due to the use PET as a raw material. Further, since the elongation in the longitudinal direction per a load of 1 kg/mm$^2$ at 120° C. was very large, slacking occurred at the step of forming a tape so that the film had poor flatness, to cause a nonuniformity of the magnetic layer. Further, the stretch ratio in the transverse direction was increased to increase the Young's modulus in the transverse direction, while the Young's modulus in the longitudinal direction was low since it was difficult to sufficiently increase the stretch ratio in the longitudinal direction. As a result, the tape underwent elongation while it was running, and it showed poor electromagnetic conversion characteristics. That is, a PET material is inferior to a PEN material as far as the total balance of the properties is concerned.

Comparative Example 2

An unstretched film was obtained in the same manner as in Example 1. The unstretched film was consecutively biaxially stretched 4.2 times in the longitudinal direction at 130° C. and 5.0 times in the transverse direction at 135° C., and while the biaxially oriented film was heat-set at 215° C., it was stretched 1.5 times in the transverse direction, and was treated in the same manner as in Example 1 to obtain a film having a heat shrinkage percentage of 0.03% in the longitudinal direction. Then, a tape was obtained in the same manner as in Example 1. Table 1 shows the results. Since the Young's modulus in the longitudinal direction was low, the tape was elongated and poor in running durability. Further, since the tape had insufficient nerve, it showed poor electromagnetic conversion characteristics.

Comparative Example 3

An unstretched film was obtained in the same manner as in Example 2 except that the inert fine particles were replaced with 0.2% by weight of silica particles having an average particle diameter of 0.1 μm as small-diameter particles and 0.09% by weight of calcium carbonate particles having an average particle diameter of 1.2 μm as large-diameter particles. The unstretched film was stretched 3.4 times in the longitudinal direction at 130° C., then stretched 3.4 times in the transverse direction at 130° C., and heat-treated at 255° C. without any relaxation treatment for adjusting the heat shrinkage percentage, to give a biaxially oriented film having a thickness of 7 μm. A tape was also obtained from the above film in the same manner as in Example 1. Table 1 shows the results. The average refractive Index nA and plane orientation coefficient NS of the base film were outside the preferred ranges, and the film was poor in thickness uniformity and flatness. As a result, the film was poor in the defect-free product ratio of rolled tapes. Further, since the Young's modulus in the longitudinal direction and the Young's modulus in the transverse direction were both low, the film was greatly poor in running durability. Moreover, since a number of fine particles and coarse particles were dispersed on the film surface, the tape showed poor electromagnetic conversion characteristics and caused dropout. Further, since coarse particles are dispersed on the tape surface, white dust greatly occurred due to abrasion while it the tape was running.

TABLE 1

| | Unit | Ex. 1 | Ex. 2 | Ex. 3 | Ex. 4 | Ex. 5 | CEx. 1 | CEx. 2 | CEx. 3 |
|---|---|---|---|---|---|---|---|---|---|
| Properties of base film | | | | | | | | | |
| Number of surface projections | | | | | | | | | |
| 1 ≦ h < 50 | piece/mm² | 4,450 | 4,500 | 4,150 | 4,600 | 4,500 | 3,800 | 4,650 | 12,300 |
| 50 ≦ h < 100 | " | 47 | 39 | 48 | 40 | 39 | 40 | 52 | 1,150 |
| 100 ≦ h < 150 | " | 17 | 15 | 24 | 12 | 15 | 35 | 28 | 270 |
| 150 ≦ h | " | 0 | 0 | 0 | 0 | 0 | 0 | 0 | 90 |
| Refractive index: | | | | | | | | | |
| nx | — | 1.743 | 1.737 | 1.754 | 1.712 | 1.702 | 1.641 | 1.741 | 1.753 |
| ny | — | 1.764 | 1.783 | 1.778 | 1.815 | 1.818 | 1.678 | 1.794 | 1.755 |
| nz | — | 1.494 | 1.485 | 1.482 | 1.479 | 1.478 | 1.487 | 1.492 | 1.519 |
| Average refractive Index: nA | — | 1.667 | 1.668 | 1.671 | — | — | — | — | — |
| Plane orientation coefficient: NS | — | 0.260 | 0.275 | 0.278 | 0.284 | 0.282 | 0.173 | 0.276 | 0.235 |
| 1.607nA–2.434 | — | 0.245 | 0.247 | 0.248 | — | — | — | — | — |
| Young's modulus: | | | | | | | | | |
| EM | kg/mm² | 650 | 640 | 610 | 550 | 530 | 450 | 450 | 500 |
| ET | " | 900 | 970 | 1,030 | 1,200 | 1,350 | 800 | 1,050 | 520 |
| Elongation in transverse direction per load of 1 kg/mm² at 120° C. | % | 0.43 | 0.33 | 0.21 | 0.10 | 0.05 | 2.55 | 0.24 | 1.05 |
| Heat Shrinkage percentage (longitudinal direction) 70° C. × 1 hr. | % | 0.03 | 0.03 | 0.03 | 0.03 | 0.03 | 0.13 | 0.03 | 0.06 |
| Defect-free product ratio | % | 95 | 95 | 98 | 95 | 95 | 70 | 70 | 30 |
| Properties of tape Electromagnetic conversion characteristics Y—S/N | dB | −2.5 | −2.8 | −2.0 | −2.5 | −2.8 | +2.0 | +1.0 | +2.5 |
| Running durability | — | ○ | ○ | ○ | ○ | ○ | Δ | X | X |
| Skew | μsec | 3 | 3 | 2 | 3 | 3 | 9 | 4 | 4 |

Notes:
Ex. = Example, CEx. = Comparative Example

According to the present invention, there is provided a polyethylene-2,6-naphthalenedicarboxylate film which is excellent in take-up properties and processability for forming a magnetic layer thereon, which gives a magnetic recording medium capable of long-hour recording and high-density recording, excellent in running durability, almost free from fluctuation in output, excellent in electromagnetic conversion characteristics, improved in skew, and which is particularly useful as a base film for a metal tape.

What is claimed is:

1. A biaxially oriented film of a polyethylene-2,6-naphthalenedicarboxylate having a longer length in the longitudinal direction that width in the transverse direction, which (1) has a Young's modulus of at least 600 kg/mm² in the transverse direction and a Young's modulus of at least 500 kg/mm² in the longitudinal direction, the Young's modulus in the transverse direction being greater than the Young's modulus in the longitudinal direction, (2) satisfies the following relationships between an elongation $S_T$ (%) in the transverse direction per a load of 1 kg/mm² and the Young's modulus $Y_T$ (kg/mm²) in the transverse direction, $$-0.001Y_T+0.89<S_T<-0.001Y_T+1.57 \quad (A)$$

when $Y_T$ is at least 1,200 kg/mm², and $$-0.31<S_T<0.37 \quad (B)$$

when $Y_T$ is greater than 1,200 kg/mm², and (3) has a heat shrinkage percentage of 0.1% or less in the longitudinal direction when heat-treated under no load at 70° C. for 1 hour.

2. The biaxially oriented film according to claim 1, wherein the Young's modulus in the transverse direction is at least 700 kg/mm².

3. The biaxially oriented film according to claim 1, wherein the Young's modulus in the transverse direction is at least 800 kg/mm².

4. The biaxially oriented film according to claim 1, wherein the Young's modulus in the transverse direction is at least 1,000 kg/mm².

5. The biaxially oriented film according to claim 1, wherein the biaxially oriented film satisfies the following relationships between a plane orientation coefficient NS and an average refractive index nA.

$$NS \geq 1.607nA-2.434 \quad (C)$$

$$1.665 \leq nA \leq 1.675 \quad (D).$$

6. The biaxially oriented film according to claim 5, wherein the biaxially oriented film has a plane orientation coefficient of at least 0.281 and an average refractive index nA satisfies the above relationship (D).

7. The biaxially oriented film according to claim 1, wherein the Young's modulus in the longitudinal direction is more than 600 kg/mm².

8. The biaxially oriented film according to claim 1, wherein the Young's modulus in the longitudinal direction is more than 700 kg/mm².

9. The biaxially oriented film according to claim 1, wherein the Young's modulus in the transverse direction is greater than the Young's modulus in the longitudinal direction by at least 230 kg/mm².

10. The biaxially oriented film according to claim 1, wherein the between $S_T$ and $Y_T$, the following relationship is satisfied when $Y_T$, is 1,200 kg/mm² or less, $$-0.001Y_T+1.05<S_T<-0.001Y_T+1.48 \quad (A)-1$$

and
the following relationship is satisfied when $Y_T$ is greater than 1,200 kg/mm², $$-0.15<S_T<0.28. \quad (B)-1$$

11. The biaxially oriented film according to claim 1, wherein, between $S_T$ and $Y_T$, the following relationship is satisfied when $Y_T$ is 1,200 kg/mm₂ or less, $$-0.001Y_T+1.14<S_T<-0.001Y_T+1.40 \quad (A)-2$$

and
the following relationship is satisfied when $Y_T$ is greater than 1,200 kg/mm², $$-0.06<S_T<0.20. \quad (B)-2$$

12. The biaxially oriented film according to claim 1, wherein the biaxially oriented film has projections on a surface thereof, and the projections are composed of projections having the following heights (nm) in the following amounts, $1 \leq h<50$ 1,000–10,000 pieces/mm²
$50 \leq h<100$ 10–200 pieces/mm²
$100 \leq h<150$ 10–100 pieces/mm²
$150 \leq h$ 0 piece/mm².

13. A biaxially oriented film of a polyethylene-2,6-naphthalenedicarboxylate having a longer length in the longitudinal direction that width in the transverse direction, which (1) has a Young's modulus of at least 700 kg/mm² in the transverse direction and a Young's modulus of at least 600 kg/mm² in the longitudinal direction, the Young's modulus in the transverse direction being greater than the Young's modulus in the longitudinal direction by at least 230 kg/mm², (2) satisfies the following relationships between an elongation $S_T$ (%) in the transverse direction per a load of 1 kg/mm² and the Young's modulus $Y_T$ (kg/mm²) in the transverse direction, $$-0.001Y_T+1.05<S_T<-0.001Y_T+1.48 \quad (A)-1$$

when $Y_T$ is at least 1,200 kg/mm², and $$-0.15<S_T<0.28 \quad (B)-1$$

when $Y_T$ is greater than 1,200 kg/mm², and (3) has a heat shrinkage percentage of 0.08% or less in the longitudinal direction when heat-treated under no load at 70° C. for 1 hour, and the biaxially oriented film satisfies the following relationships between a plane orientation coefficient NS and an average refractive index nA, $$NS \geq 1.607nA-2.434 \quad (C)$$

$$1.658 \leq nA \leq 1.665 \quad (D).$$

14. The biaxially oriented film according to claim 13, wherein the biaxially oriented film has a plane orientation coefficient of at least 0.281 and an average refractive index nA satisfies the above relationship (D).

15. The biaxially oriented film according to claim 13, wherein the biaxially oriented film has projections on a surface thereof, and the projections are composed of projections having the following heights (nm) in the following amounts,

| | |
|---|---|
| $1 \leq h < 50$ | 1,000–10,000 pieces/mm² |
| $50 \leq h < 100$ | 10–200 pieces/mm² |
| $100 \leq h < 150$ | 10–100 pieces/mm² |
| $150 \leq h$ | 0 piece/mm². |

16. A biaxially oriented film of a polyethylene-2,6-naphthalenedicarboxylate having a longer length in the longitudinal direction than width in the transverse direction, which (1) has a Young's modulus of at least 1000 kg/mm² in the transverse direction and a Young's modulus of at least 700 kg/mm² in the longitudinal direction, the Young's modulus in the transverse direction being greater than the Young's modulus in the longitudinal direction by at least 230 kg/mm², (2) satisfies the following relationships between an elongation $S_T$ (%) in the transverse direction per a load of 1 kg/mm² and the Young's modulus $Y_T$ (kg/mm²) in the transverse direction, $$-0.001Y_T+1.14 < S_T < -0.001Y_T+1.40 \quad \text{(A)-2}$$

when $Y_T$ is at least 1,200 kg/mm², and $$-0.06 < S_T < 0.20 \quad \text{(B)-2}$$

when $Y_T$ is greater than 1,200 kg/mn², and (3) has a heat shrinkage percentage of 0.05% or less in the longitudinal direction when heat-treated under no load at 70° C. for 1 hour, and the biaxially oriented film satisfies the following relationships between a plane orientation coefficient NS and an average refractive index nA, $$NS \geq 1.607nA - 2.434 \quad \text{(C)}$$

$$1.658 \leq nA \leq 1.665 \quad \text{(D)}.$$

17. The biaxially oriented film according to claim 16, wherein the biaxially oriented film has a plane orientation coefficient of at least 0.281 and an average refractive index nA satisfies the above relationship (D).

18. The biaxially oriented film according to claim 16, wherein the biaxially oriented film has projections on a surface thereof, and the projections are composed of projections having the following heights (nm) in the following amounts,

| | |
|---|---|
| $1 \leq h < 50$ | 1,000–10,000 pieces/mm² |
| $50 \leq h < 100$ | 10–200 pieces/mm² |
| $100 \leq h < 150$ | 10–100 pieces/mm² |
| $150 \leq h$ | 0 piece/mm². |

\* \* \* \* \*